US012788014B2

(12) United States Patent
Zhang

(10) Patent No.: US 12,788,014 B2
(45) **Date of Patent: *Nov. 10, 2026**

(54) SYNERGISTIC EFFECT OF ISOXABEN AND CELLULOSIN AS AN HERBICIDE

(71) Applicant: Purdue Research Foundation, West Lafayette, IN (US)

(72) Inventor: Chunhua Zhang, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,061

(22) Filed: Nov. 6, 2023

(65) Prior Publication Data

US 2024/0065270 A1 Feb. 29, 2024

Related U.S. Application Data

(60) Continuation of application No. 17/965,703, filed on Oct. 13, 2022, now Pat. No. 11,805,780, which is a division of application No. 16/559,799, filed on Sep. 4, 2019, now Pat. No. 11,497,213.

(60) Provisional application No. 62/726,443, filed on Sep. 4, 2018.

(51) Int. Cl.
*A01N 43/80* (2006.01)
*A01N 47/34* (2006.01)

(52) U.S. Cl.
CPC ............. *A01N 43/80* (2013.01); *A01N 47/34* (2013.01)

(58) Field of Classification Search
None
See application file for complete search history.

(56) References Cited

U.S. PATENT DOCUMENTS

| | | | | |
|---|---|---|---|---|
| 11,497,213 B2* | 11/2022 | Zhang | A01N 43/80 |
| 11,938,121 B2* | 3/2024 | Zhang | A61K 31/01 |
| 2006/0211576 A1* | 9/2006 | Zagar | A01N 43/40 504/131 |
| 2020/0068892 A1* | 3/2020 | Zhang | A01N 43/80 |
| 2020/0290959 A1* | 9/2020 | Zhang | C07C 335/40 |
| 2024/0100030 A1* | 3/2024 | Zhang | A61K 31/17 |
| 2025/0263368 A1* | 8/2025 | Zhang | A01N 47/34 |

FOREIGN PATENT DOCUMENTS

| | | |
|---|---|---|
| CN | 1125719 A | 7/1996 |
| CN | 107041374 A | 8/2017 |

OTHER PUBLICATIONS

Norsworthy et al. Weed Science, 2012, 60(spl), 31-62.*

Huang, L., et al., "Endosidin20 Targets the Cellulose Synthase Catalytic Domain to Inhibit Cellulose Biosynthesis", The Plant Cell, vol. 32, Jul. 2020, pp. 2141-2157.

Solanti, N., et al., "Potential Corn Yield Losses from Weeds in North America", Weed Technology, vol. 30, (2016) No. 4, pp. 979-984, : https://doi.org/10.1614/WT-D-16-00046.1.

Swanton, C., et al., "Crop Losses Due to Weeds in Canada", Weed Technology, vol. 7, No. 2, Apr.-Jun. 1993, pp. 537-542.

Solanti, N., et al., "Potential Yield Loss in Sugar Beet Due to Weed Interference in the United States and Canada", Weed Technology, vol. 32, No. 6, Dec. 1, 2018, pp. 749-753.

Gianessi, L. P., et al., "The increasing importance of herbicides in worldwide crop production", Pest Manag Sci, vol. 69, 2013, pp. 1099-1105.

Funke, T., et al., "Molecular basis for the herbicide resistance of Roundup Ready crops", Proce Natl Acad Sci USA, vol. 103, No. 35, Aug. 29, 2006, pp. 13010-13015.

Edwards, C.B., et al., "Benchmark study on glyphosate-resistant crop systems in the United States. Economics of herbicide resistance management practices in a 5 year field-scale study", Pest Manag Sci, vol. 70, No. 12, Feb. 6, 2014, pp. 1924-1929.

Beres, Z.T., et al. "High Levels of Glyphosate Resistance in Conyza canadensis from Agricultural and Non-Agricultural Sites in Ohio and Iowa", Scientific Reports, vol. 8, (2018), 8 pages.

Morran, S., et al., "Multiple target site resistance to glyphosate in junglerice (*Echinochloa colona*) lines from California orchards", Pest Manag Sci, vol. 74, No. 12, May 2, 2018, pp. 2747-2753.

Heim, D.R., et al., "Mutation of a Locus of *Arabidopsis thaliana* Confers Resistance to the Herbicide Isoxaben", Plant Physiology, vol. 90, Issue 1, May 1989, pp. 146-150.

Scheible, W.R., et al., "Modifications of cellulose synthase confer resistance to isoxaben and thiazolidinone herbicides in *Arabidopsis* Ixr1 mutants", PNAS, vol. 98, No. 18, Aug. 28, 2001, pp. 10079-10084.

Desprez, T., et al., "Resistance against herbicide isoxaben and cellulose deficiency caused by distinct mutations in same cellulose synthase isoform CESA6", Plant Physiology, vol. 128, Issue 2, Feb. 2002, pp. 482-490.

Brabham, C., et al., "Indaziflam Herbicidal Action: A Potent Cellulose Biosynthesis Inhibitor", Plant Physiology, vol. 166, Issue 3, Nov. 2014, pp. 1177-1185.

Hu, Z., et al., "Genome Editing-Based Engineering of CESA3 Dual Cellulose-Inhibitor-Resistant Plants", Plant Physiology, vol. 180, Issue 2, Jun. 2019, pp. 827-836.

Gallery Infosheet (cached Wayback Machine May 10, 2016: https://web.archive.org/web/20160610020859/ https://newsomseed.com.resources/GalleryBrochure.pdf) no pagination, 2 pages, (2016).

Norsworthy, J.K., et al. "Reducing the Risks of Herbicide Resistance: Best Management Practices and Recommendations", Weed Science, 2012 Special Issue, pp. 31-62.

(Continued)

*Primary Examiner* — Erin E Hirt

(74) *Attorney, Agent, or Firm* — Purdue Research Foundation

(57) ABSTRACT

The present application relates to a method of weed control for a crop field using a synergistic effect of two herbicides cellulosin and isoxaben. A composition matter together with said method comprising cellulosin and isoxaben is within the scope of the present invention.

13 Claims, 12 Drawing Sheets

(56) References Cited

OTHER PUBLICATIONS

Drakakaki, G., et al., "Clusters of bioactive compounds target dynamic endomembrane networks in vivo", PNAS, vol. 108, Issue 43, Oct. 17, 2011, pp. 17850-17855.

Texas Cooperative Extension, "Suggestions for weed control in corn", http://countries.agrilife.org/colorado/files/2011/08/weed-control-for-corn_20.pdf, 2011, 27 pages.

* cited by examiner

SYNERGISTIC EFFECT OF ISOXABEN AND CELLULOSIN AS AN HERBICIDE

CROSS REFERENCE TO RELATED APPLICATIONS

The present patent application is a continuation of U.S. patent application Ser. No. 17/965,703, now U.S. patent Ser. No. 11/805,780, filed Oct. 13, 2022, which was a divisional of U.S. patent application Ser. No. 16/559,799, now U.S. patent Ser. No. 11/497,213, filed Sep. 4, 2019, and relates to and claims the priority benefit of U.S. Provisional Application Ser. No. 62/726,443, filed Sep. 4, 2018, the contents each of which is hereby incorporated herein by reference in its entirety.

TECHNICAL FIELD

The present application relates to a method for weed control of a field using the synergistic effect of two or more herbicides, including cellulosin and isoxaben. A composition matter comprising cellulosin and isoxaben is also in the scope of the present invention.

BACKGROUNDS AND SUMMARY OF THE INVENTION

This section introduces aspects that may help facilitate a better understanding of the disclosure. Accordingly, these statements are to be read in this light and are not to be understood as admissions about what is or is not prior art.

Weed plants compete with desired crops in the field for resources and often negatively affect crop yield and quality significantly (Soltani, N, et al., *Weed Technol.* 2016, 30, 979-984; Swanton, C. J., et al., *Weed Technol.,* 1993, 7, 537-542; Soltani, N, et al., *Weed Technol.* 2018, 32, 342-346). Herbicides play essential roles in agricultural productions in both developed and developing countries by allowing farmers to control weed plants without using a lot of human labor (Gianessi, L. P. Pest Manag Sci. 2013, 69, 1099-1105). By growing herbicide-resistant crops that are created through genetic modification and spraying corresponding herbicide in the field, the farmers can control weed plants without killing the crops (Funke, T, et al., Proc Natl Acad Sci USA 2006, 103, 13010-13015). However, herbicide-resistant weeds have become a significant problem in agricultural production because of repetitive application of the same type of herbicide (Edwards, C. B., et al., Pest Manag. Sci. 2014, 70, 1924-1929; Beres, Z. T. et al., Sci Rep. 2018, 8, 10483; Morran, S. et al., Pest Manag Sci, 2018, 74, 2747-2753). Developing herbicide with a novel mode of action and crops that are resistant to the novel herbicide is essential for efficient weed control in global agricultural production.

A method is disclosed herein for weed control of a crop field using the synergistic effect of two different herbicides cellulosin and isoxaben.

A method is disclosed herein for weed control of a crop field using a combination of cellulosin and isoxaben, together with one or more other herbicides of the same or different mode of action.

A method is disclosed herein for reducing the resistance of a weed to an herbicide, wherein the method comprises the step of treating a weed with a combination of cellulosin and isoxaben, together with one or more diluents, excipients or carriers.

A composition for weed control of a crop field comprises cellulosin and isoxaben.

BRIEF DESCRIPTION OF DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein:

FIG. 4A shows Arabidopsis wildtype plants grown on DMSO, Cellulsoin, isoxaben, indaziflam, C17, Cellulosin with isoxaben, Cellulosin with indaziflam, and Cellulosin with C17. Plant growth was not inhibited by 0.25 Cellulosin, 4 nM isoxaben, 0.25 nM indaziflam or 4 nM C17 significantly. However, combined application of 0.25 μM Cellulosin and 4 nM isoxaben, 0.25 μM Cellulosin and 0.25 nM indaziflam, or 0.25 μM Cellulosin and 4 nM C17 significantly inhibited plant growth. Bar, 1 cm.

FIG. 4B shows quantification on the root length of Arabidopsis plants grown on media with control (0.1% DMSO), 0.25 μM Cellulosin, 4 nM isoxaben, 0.25 nM indaziflam, 4 nM C17, 0.25 μM Cellulosin and 4 nM isoxaben, 0.25 μM Cellulosin with 0.25 nM indaziflam, or 0.25 μM Cellulosin and 4 nM C17. Statistically significant differences in right panels were determined by one-way ANOVA test followed by Tukey's multiple comparisons test. Different letters of root length of seedlings indicate significant difference between groups ($p<0.05$). N=12.

FIG. 5A shows Cellulosin inhibition of tomato growth. FIG. 5B shows Cellulosin inhibition of tobacco growth. FIG. 5C shows Cellulosin inhibition of Kentucky Bluegrass growth. FIG. 5D shows Cellulosin inhibition of Perennial Ryegrass growth. FIG. 5E shows Cellulosin inhibition of soybean growth. FIG. 5F shows Cellulosin inhibition of maize growth. Bars: 1 cm. Statistical analysis was performed using student t-test. $^{}p<0.01$. $^{*}p<0.001$.

FIG. 6A shows Arabidopsis plants sprayed with control solution. FIG. 6B shows Arabidopsis plants sprayed with Cellulosin (500 μM).

Figure 1A:
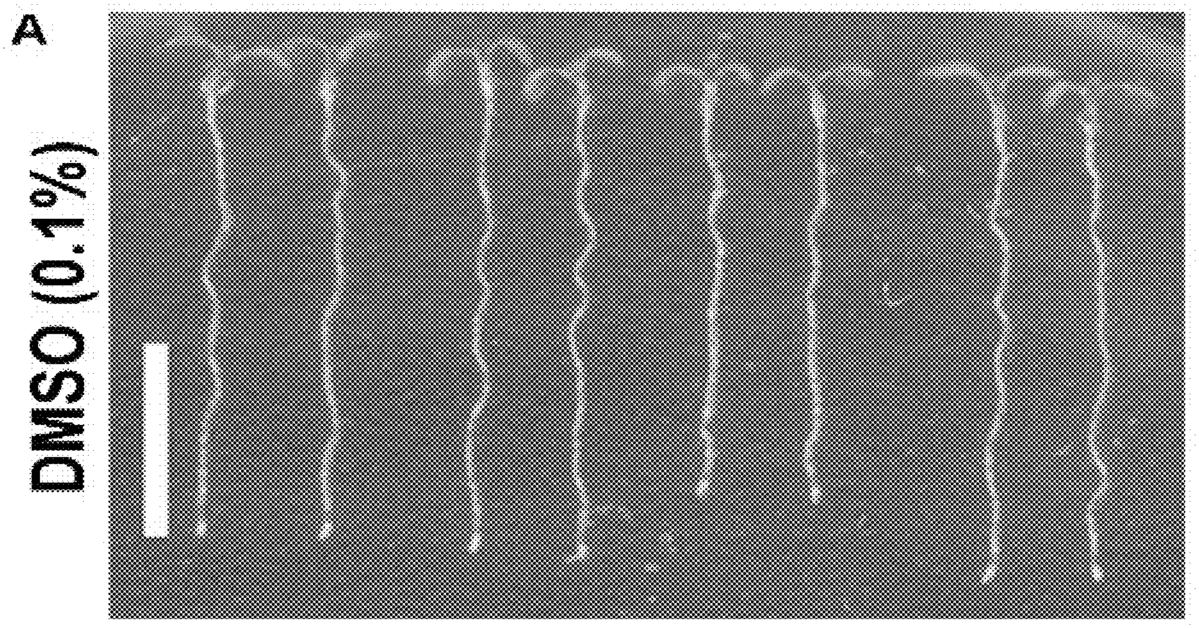
FIGS. 1A-1F show that known isoxaben resistant mutants ixr1-1, ixr1-2 and ixr2-1 are not resistant to Cellulosin. Wildtype (WT) Arabidopsis and its mutants ixr1-1, ixr1-2, and ixr2-1 are grown on media supplemented with DMSO (FIGS. 1A-1B), isoxaben (FIGS. 1C-1D) or Cellulosin (FIGS. 1E-1F) and their quantifications on their root length. Arabidopsis mutants ixr1-1, ixr1-2 and ixr2-1 have longer roots in compare with wildtype (Col) on media supplemented with isoxaben. However, these mutants do not show difference in growth in compare with wildtype (Col) on media supplemented with Cellulosin. Bars: 1 cm
Figure 1B:
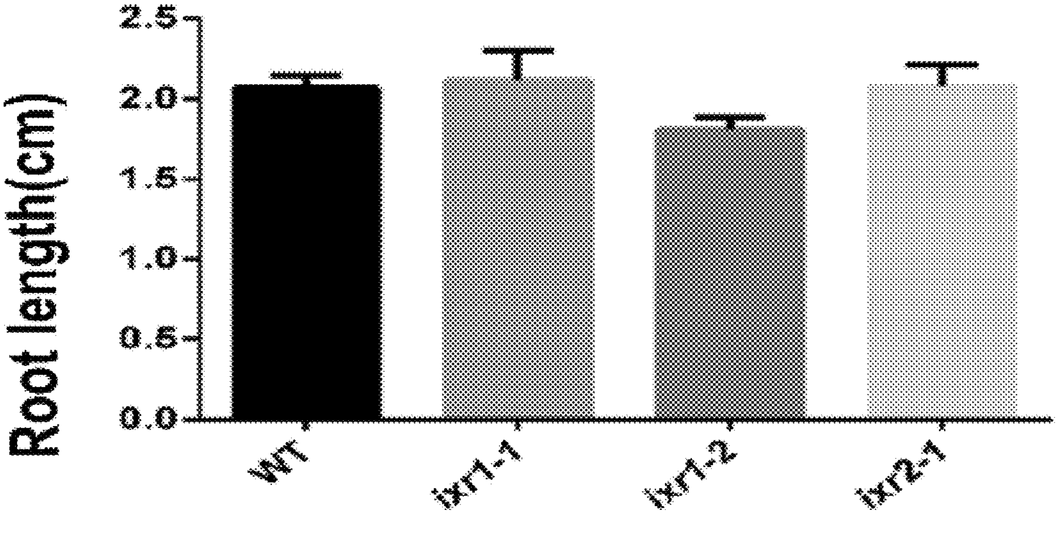
Figure 1C:
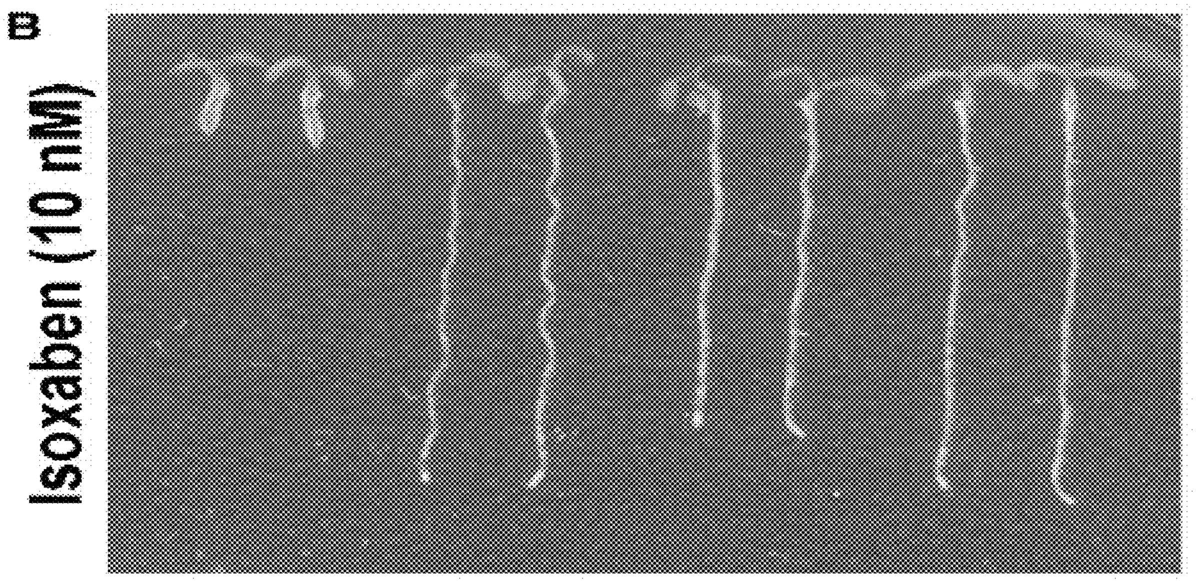
Figure 1D:
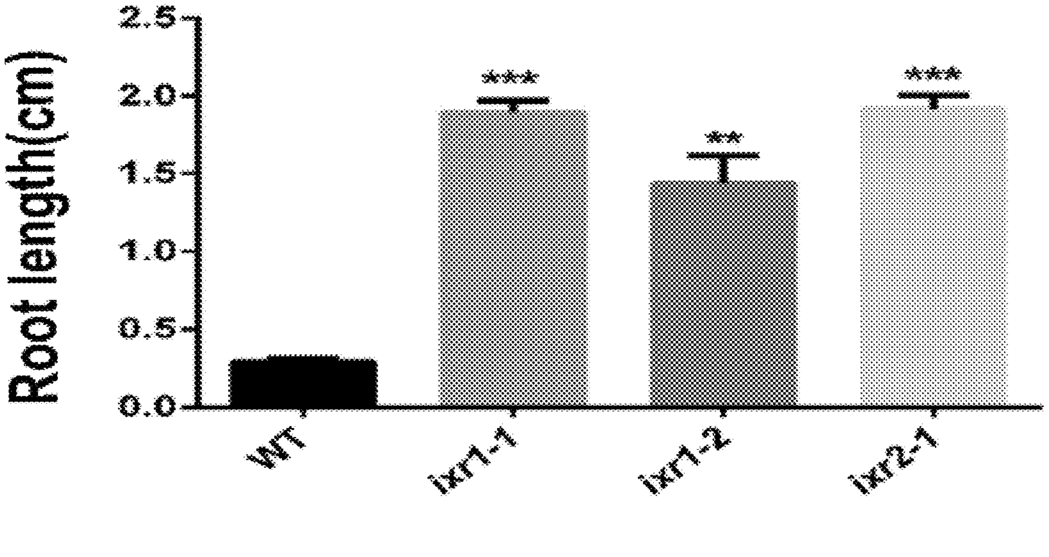
Figure 1E:
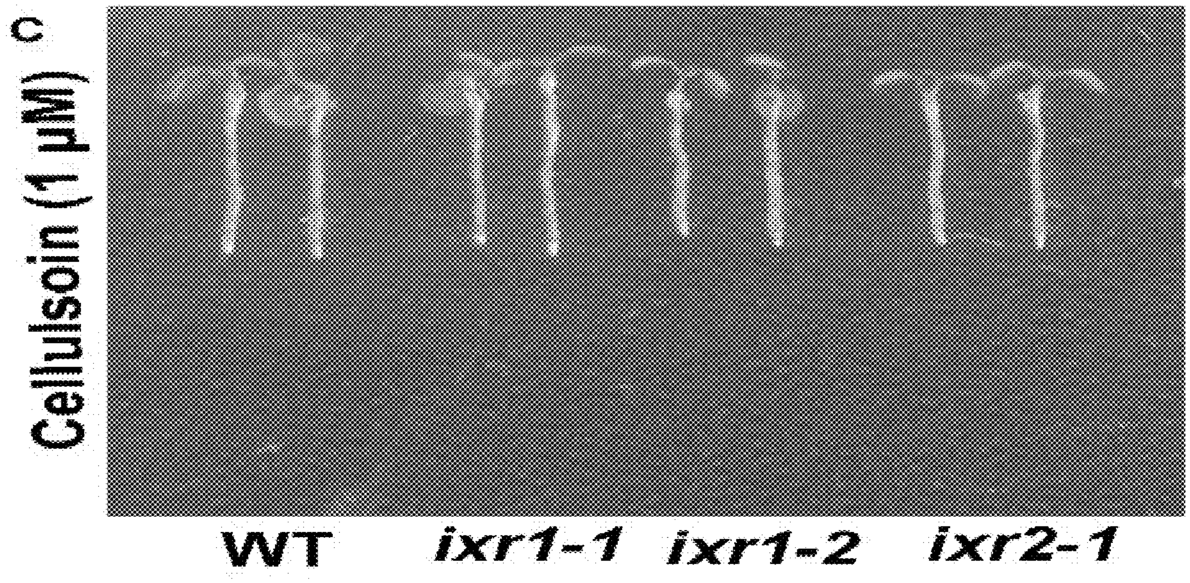
Figure 1F:
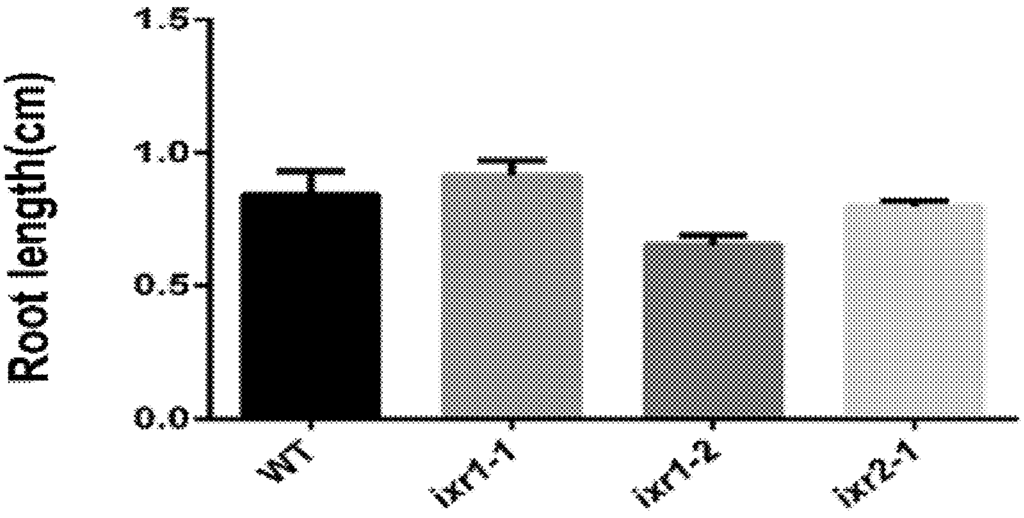

An overview of the features, functions and/or configurations of the components depicted in the various figures will now be presented. It should be appreciated that not all of the features of the components of the figures are necessarily described. Some of these non-discussed features, such as various couplers, etc., as well as discussed features are inherent from the figures themselves. Other non-discussed features may be inherent in component geometry and/or configuration.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 20%, within 10%, within 5%, or within 1% of a stated value or of a stated limit of a range.

In the present disclosure, the term "substantially" can allow for a degree of variability in a value or range, for example, within 70%, within 80%, within 90%, within 95%, or within 99% of a stated value or of a stated limit of a range.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting. Further, information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In some illustrative embodiments, this present invention relates to a method of weed control for a field of a plant comprising the step of applying isoxaben and cellulosin, together with one or more diluents, excipients or carriers to a field in need of weed control.

In some other illustrative embodiments, the method of weed control for a field of a plant further comprise a step of applying one or more other herbicides of the same or different mode of action to said field.

In some illustrative embodiments, this present invention relates to a method of weed control for a field of a plant, wherein said isoxaben and cellulosin are applied to a field of a plant together as a mixture of preformulated single product.

In some illustrative embodiments, this present invention relates to a method of weed control for a field of a plant, wherein said isoxaben and cellulosin are applied to a field of a plant separately as an individually pre-formulated product, consequentially or concurrently.

In some illustrative embodiments, this present invention relates to a method of weed control for a field of a plant, wherein said isoxaben and cellulosin are applied to a field of a plant together with one or more other herbicides of the same or different mode of action.

In some illustrative embodiments, this present invention relates to a method of weed control for a field of a plant, wherein said plant is a crop for food or feed.

In some illustrative embodiments, this present invention relates to a method of weed control for a field of a plant as disclosed herein, wherein said plant is resistant to cellulsoin.

In some illustrative embodiments, this present invention relates to a method of weed control for a field of a plant as disclosed herein, wherein said plant is resistant to isoxaben.

In some illustrative embodiments, this present invention relates to a method of weed control for a field of a plant as disclosed herein, wherein the ratio of said isoxaben and cellulosin ranges from about 1:100 to about 100:1 on a molar basis.

In some illustrative embodiments, this present invention relates to a composition comprising isoxaben and cellulosin, together with one or more diluents, excipients or carriers.

In some illustrative embodiments, this present invention relates to a composition comprising isoxaben and cellulosin as disclosed herein, wherein the ratio of isoxaben and cellulosin ranges from about 1:100 to about 100:1 on a molar basis.

In some illustrative embodiments, this present invention relates to a composition comprising isoxaben and cellulosin as disclosed herein, wherein amount/concentration of isoxaben and cellulosin ranges from about 0.01 mg/mL to about 5000 mg/mL.

In some illustrative embodiments, this present invention relates to a method for reducing herbicide resistance comprising the step of applying cellulosin and isoxaben to a field of a plant for weed control therein.

In some illustrative embodiments, this present invention relates to a method for reducing herbicide resistance, wherein said method further comprising a step of applying one or more other herbicides of the same or different mode of action to a field of a plant for weed control therein.

In some illustrative embodiments, this present invention relates to a method for reducing herbicide resistance, wherein said isoxaben and cellulosin are applied to a field of a plant together as a mixture of pre-formulated single product.

In some illustrative embodiments, this present invention relates to a method for reducing herbicide resistance, wherein said isoxaben and cellulosin are applied to a field of a plant separately as an individually pre-formulated product, consequentially or concurrently.

In some illustrative embodiments, this present invention relates to a method for reducing herbicide resistance, wherein said isoxaben and cellulosin are applied to a field of a plant together with one or more other herbicides of the same or different mode of action.

In some illustrative embodiments, this present invention relates to a method for reducing herbicide resistance, wherein said plant is resistant to cellulosin and isoxaben.

In some illustrative embodiments, this present invention relates to a method for reducing herbicide resistance, wherein said plant is a crop for food or feed.

In some illustrative embodiments, this present invention relates to a method for reducing herbicide resistance, wherein the ratio of isoxaben and cellulosin ranges from about 1:100 to about 100:1 on a molar basis.

In some illustrative embodiments, this present invention relates to a method for reducing herbicide resistance, wherein the amount of said isoxaben and cellulosin ranges from about 0.01 mg/mL to about 5000 mg/mL.

In some illustrative embodiments, this present invention relates to a method for reducing herbicide resistance as disclosed herein, wherein said plant is resistant to cellulsoin.

In some illustrative embodiments, this present invention relates to a method for reducing herbicide resistance as disclosed herein, wherein said plant is resistant to isoxaben.

In some embodiments, the composition of isoxaben and cellulosin may be formulated in various dosage forms, including, but not limited to, dry formulation, liquid formulation, granular or pellet formulation. The practice and information are known in the arts. In some other embodiments, the final product of the composition disclosed herein may be formulated as a suspension, a liquid spray, a powder, a nanoparticle, or an aerosol, together with one or more adjuvants, excipients or carriers.

In preparing a product for an end user, adjuvants, surfactants, anti-drifting agents, colorings, anti-freezing or other stabilizing chemicals may be included. An adjuvant is an additive (usually in relatively low amounts compared to the carrier) that improves or enhances application, performance, safety, storage, or handling of an active ingredient. Adjuvants include materials such as: Surfactants (spreaders, stickers, emulsifiers, wetting agents), which increase surface contact, reduce runoff, and increase penetration through leaf cuticle.

It is understood that, the herbicides disclosed herein can be applied to a field of a plant for weed control at the same time as a pre-formulated mixture, or applied individually as a separately pre-formulated product, consequentially or concurrently.

It is understood that, multiple application of said composition of herbicides may be needed in some cases in order achieve effective and efficient weed control for a field of a plant. As disclosed herein said plant is resistant to the herbicides applied.

Isoxaben (N-3[1-ethyl-1-methylpropyl]-5-isoxazolyl-2,6, or dimethoxybenzamide) is a broad-leaf herbicide used primarily on small grains, turf, and ornamentals. It has been suggested that Isoxaben inhibits the incorporation of glucose into the cellulose-rich acid-insoluble fraction of isolated cell walls and has been proposed to be a specific inhibitor of cellulose biosynthesis. Treated cells of sensitive species fail to elongate normally and consequently grow isodiametrically. Analysis of the effects of the compound on the polysaccharide composition of cell walls and other aspects of plant physiology has led to the proposal that the herbicidal action of isoxaben can be explained entirely by its effect on cellulose biosynthesis.

As it is disclosed herein, cellulosin is a small molecule compound that acts as an inhibitor toward cellulose synthase (CesA), an enzyme that catalyzes the synthesis of cellulose. Cellulosins were discovered as potential herbicides, which is described in Zhang, U.S. Patent Application Publication US 2020/0290959 A1, published Sep. 17, 2020, wherein the structures of cellulosins are defined in claim 4 and further exemplified by FIG. 1A.

Cellulosin is a small molecule that inhibits plant growth by targeting the conserved catalytic domain of cellulose synthase (CesA), the enzyme that catalyzes the synthesis of cellulose. The discovery of Cellulosin is being documented in Zhang, U.S. Patent Application Publication, US 2020/0290959 A1, published Sep. 17, 2020, and the content of which is incorporated herein in its entirety. Further characterization of the herbicide effect of Cellulosin by spraying the Arabidopsis plants with Cellulosin and testing the inhibitory effects of Cellulosin on different crops led to our discovery that Cellulosin has different mode of action than other cellulose synthesis inhibitors isoxaben, indaziflam and C17. The known mutants that are resistant to isoxaben are sensitive to Cellulosin. Most of our mutants that are resistant to Cellulosin are sensitive to isoxaben, indaziflam and C17. This indicates that Cellulosin has different target site as isoxaben, indaziflam and C17. Cellulosin has synergistic effect with isoxaben, a benzamide family of herbicide for preemergence control of broadleaf weeds, and indaziflam.

We have discovered that 250 nM Cellulosin, 4 nM isoxaben or 0.06 nM of indaziflam did not inhibit plant growth. However, combined application 250 nM Cellulosin with 3.5 nM isoxaben and 250 nM Cellulosin with 0.06 nM indaziflam significantly inhibits plant growth. These results show that combined application of Cellulosin with other two herbicides at low concentration can be efficient in weed control. This method of herbicide application has at least two advantages. First, it reduces the cost of herbicides because lower dosage of each is needed. Second, because Cellulosin has different mode of action than isoxaben and indaziflam, combined application of Cellulosin with either of the other two can reduce the chance of herbicide resistance development in weeds that is caused by repetitive application of the same herbicide. We would like to file a disclosure on the method of applying Cellulosin together with isoxaben or Cellulosin with indaziflam at the same time for more efficient weed control.

Cellulosin, Isoxaben, Indaziflam and C17 have Different Mode of Action.

Isoxaben was found as a potent herbicide that targets the cellulose synthase of plants. Previously, some Arabidopsis cellulose synthase mutants have been found to be resistant to isoxaben (Heim, D. R. et al., *Plant Physiol.* 1989, 90, 146-150: Scheible, W. R., et al., *Proc Natl Acad Sci USA,* 2001, 98, 10079-10084; Desprez, T. et al., *Plant Physiol* 2002, 128, 482-490). These mutants carry mis-sense mutations at the amino acids located at the C-terminus of CesA3 and CesA6. Indaziflam was recently characterized as a cellulose biosynthesis inhibitor and has been used as an herbicide (Brabham, C. et al., Plant Physiol 2014, 166, 1177-1185). C17 has also been found to inhibit cellulose biosynthesis and has potential to serve as an herbicide (Hu, Z. et al., *Plant Physiol* 2019, 180, 827-836).

Recently, we discovered a new cellulose synthase inhibitor Cellulosin and a group of cesa6 mutants that carry mis-sense mutations at the central cytoplasmic region that contains the catalytic motif and are resistant to Cellulosin. In order to test whether Cellulosin has the same mode of action as isoxaben, indaziflam and C17, we first tested the growth of isoxaben resistant mutants on media supplemented with Cellulosin. It was discovered that isoxaben resistant mutants ixr1-1, ixr1-2 and ixr2-1 have the same sensitivity to Cellulosin as wildtype Arabidopsis in growth (FIGS. 1A-1F). We next tested the growth of our Cellulosin resistant mutants on isoxaben, indaziflam and C17. It was found that while all of these mutants are resistant to Cellulosin, only a few of our mutants show reduced sensitivity to isoxaben, indaziflam and C17 (FIG. 2). Further testing the growth of transgenic plants that express CesA6 with mis-sense mutations at the hypothesized Cellulosin binding sites in cesa6 loss-of-function mutant background on isoxaben, indaziflam and C17 revealed that these mutants are resistant to Cellulosin, they have the same sensitivity to isoxaben, indaziflam and C17 (FIGS. 3A-3D). The results indicate that Cellulosin has a different mode of action than isoxaben, indaziflam and C17. These results indicate that Cellulosin has a different mode of action than isoxaben, indaziflam and C17.

Cellulosin has Synergistic Effect with Isoxaben, Indaziflam and C17 in Inhibiting Plant Growth.

Figure 4A:
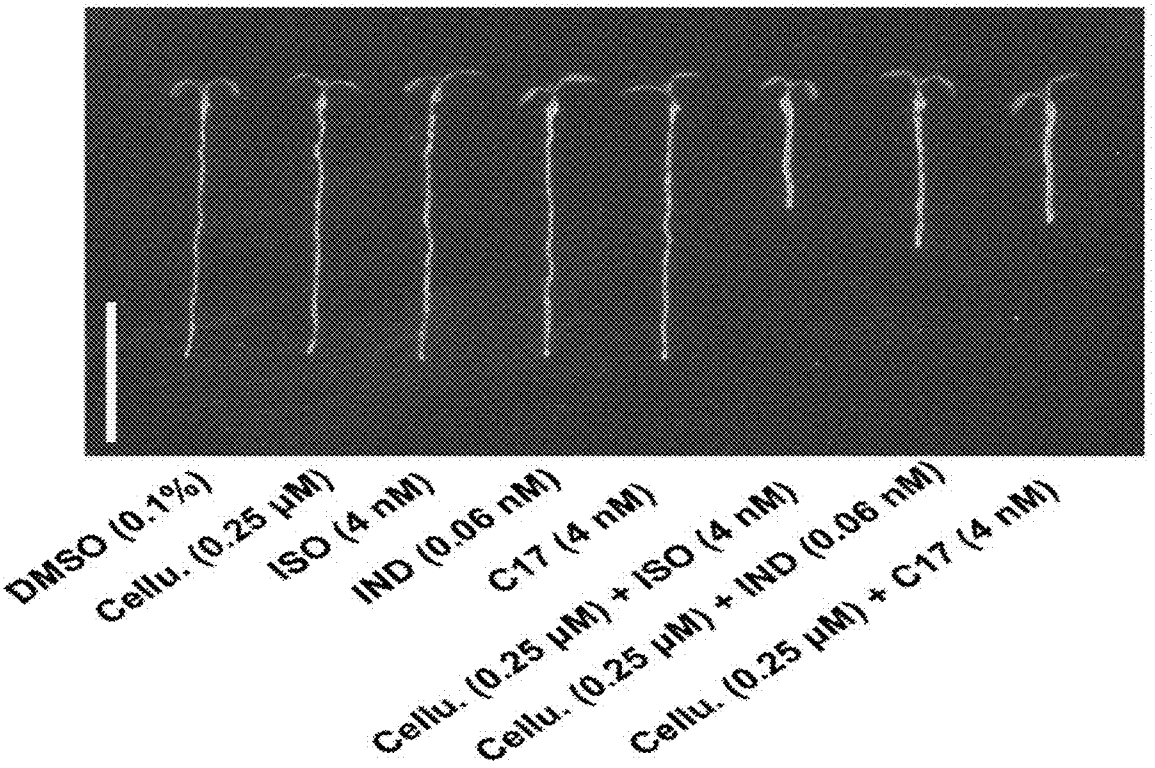
FIGS. 4A-4B demonstrate the synergistic effect of Cellulosin with isoxaben and indaziflam.
Figure 4B:
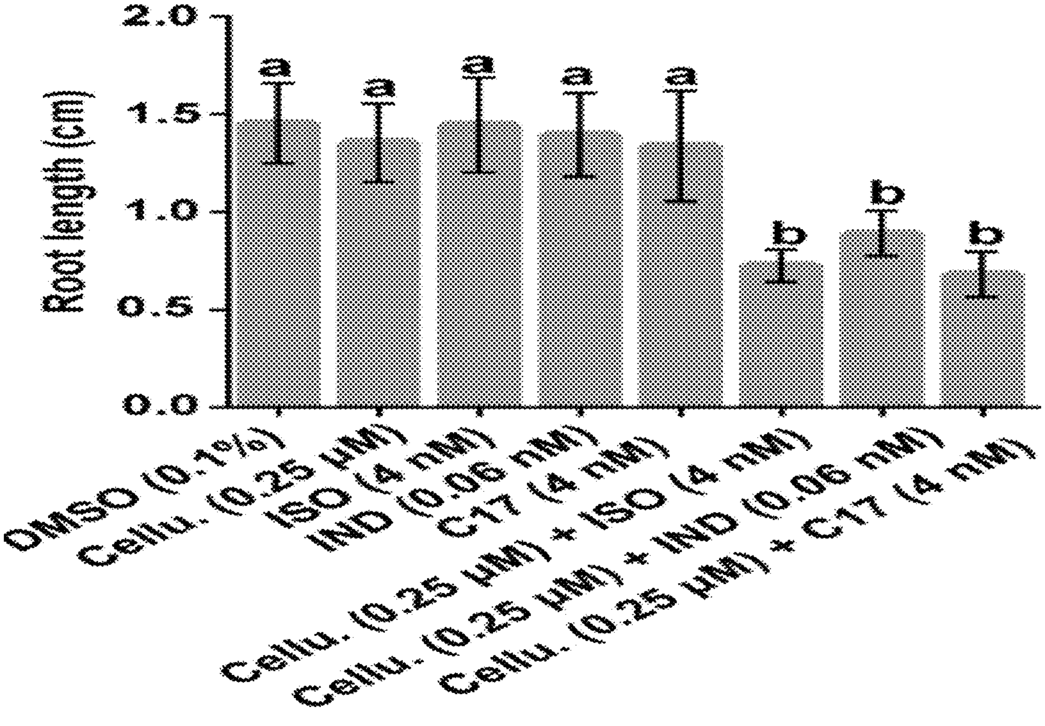

Because Cellulosin has different target as isoxaben, indaziflam and C17. Since the need to avoid the development of herbicide-resistant weeds that is caused by repetitive application of the same herbicide is utmost, we decided to test whether application of Cellulosin together with isoxaben, indaziflam and C17 would make it possible to control the weeds more efficiently with reduced dosage of two herbicides. Testing the growth of Arabidopsis at lower dosage of Cellulosin, isoxaben, indaziflam and C17, we discovered that at 0.25 μM concentration, Cellulosin does not significantly inhibit plant growth (FIGS. 4A-4B). At 4 nM concentration, isoxaben does not significantly inhibit plant growth. At 0.06 nM, indaziflam does not significantly inhibit plant growth. However, when we apply 0.25 μM Cellulosin and 4 nM isoxaben in the growth media, plant growth is significantly inhibited (FIGS. 4A-4B). When we apply 0.25 μM Cellulsoin and 0.25 nM indaziflam in the growth media, plant growth is significantly inhibited as well. This indicates that the combination of Cellulosin with isoxaben or indaziflam can increase the efficiency of weed control.

Figure 5A:
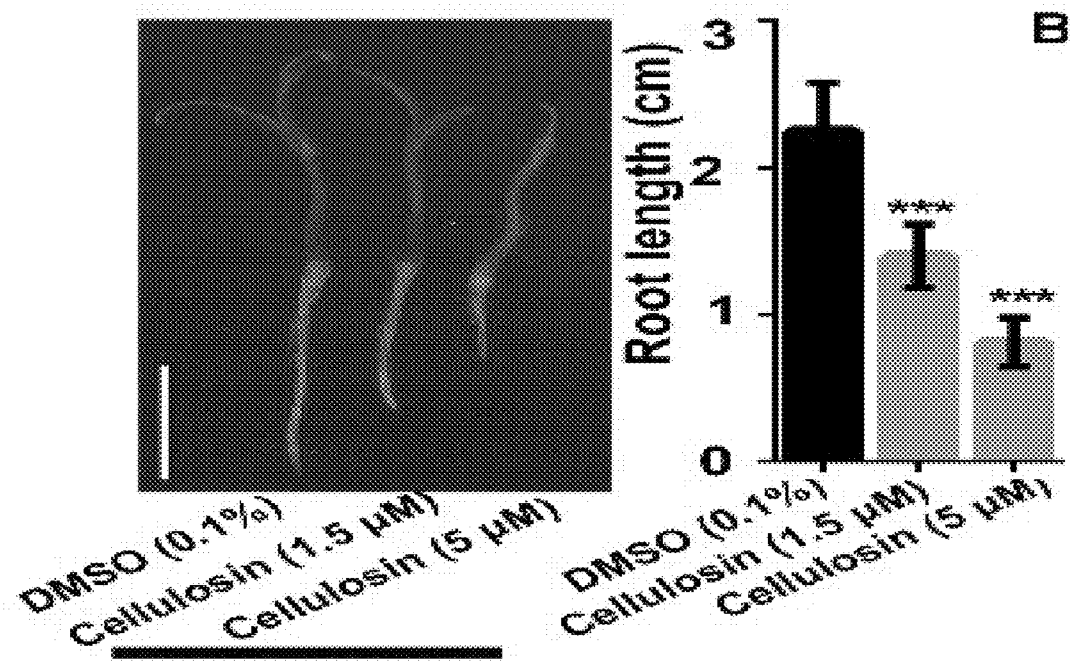
FIGS. 5A-5F demonstrate that Cellulosin inhibits the growth of different plant species.
Figure 5B:
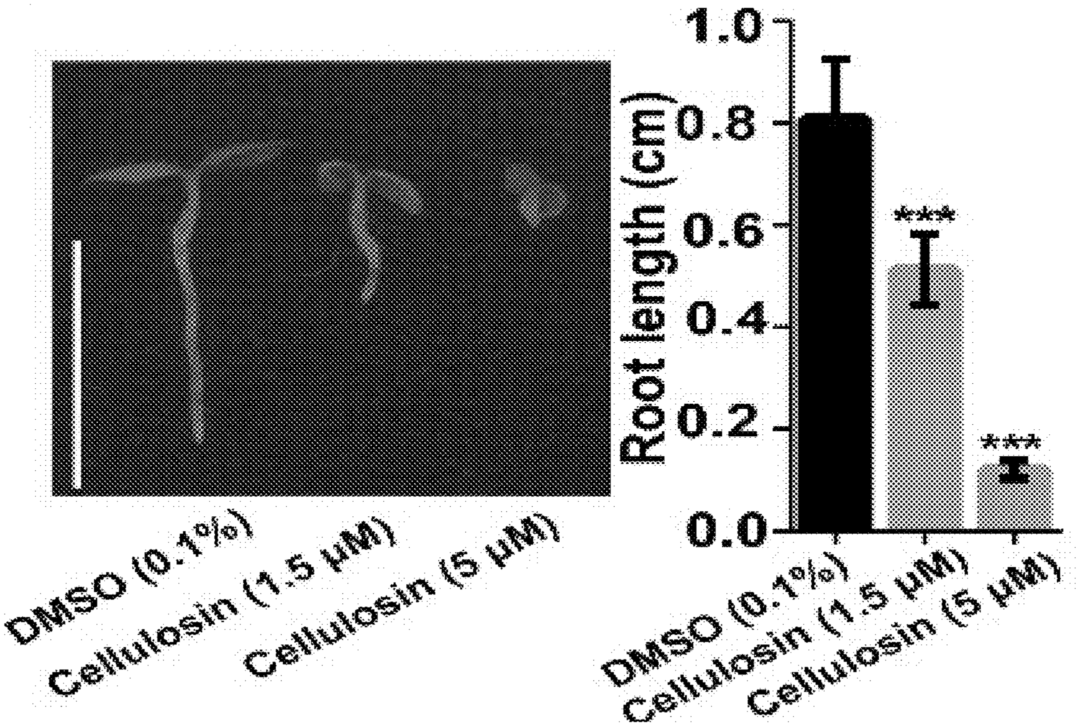
Figure 5C:
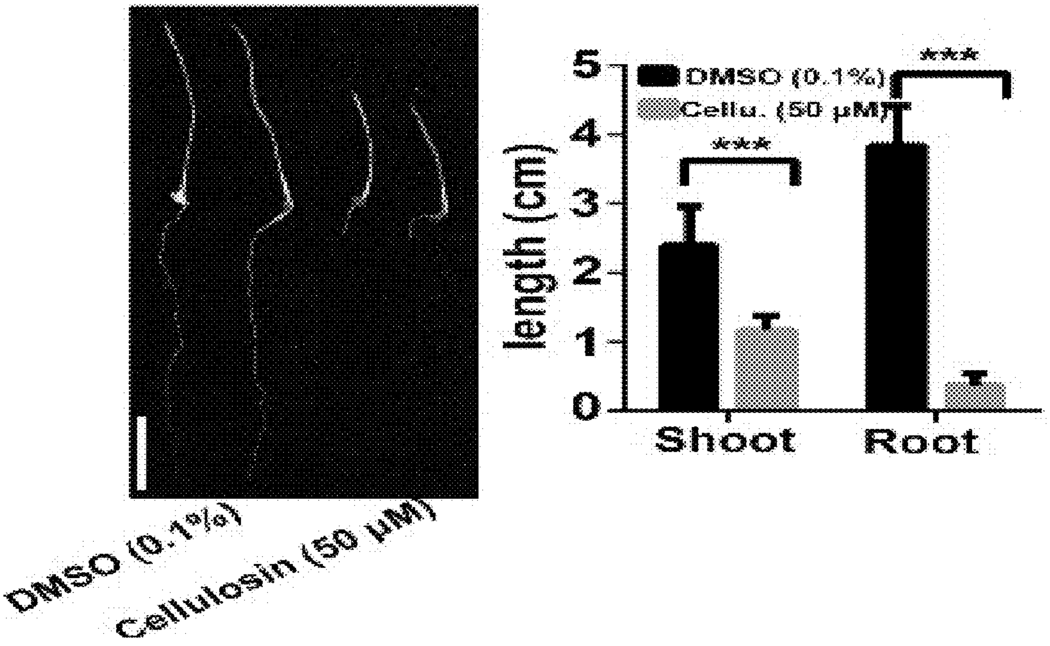
Figure 5D:
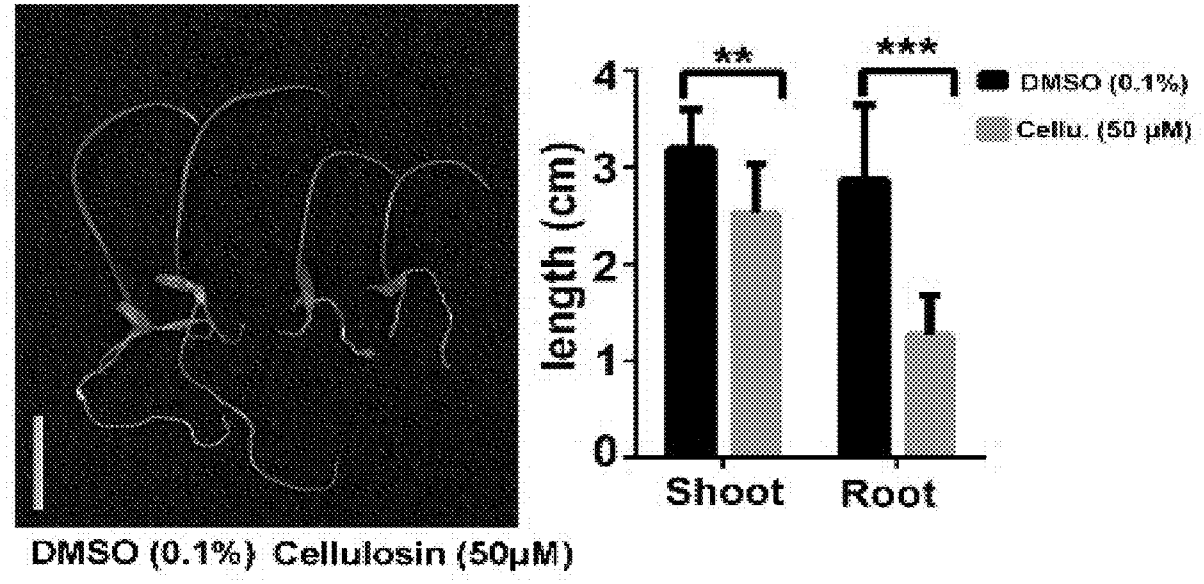
Figure 5E:
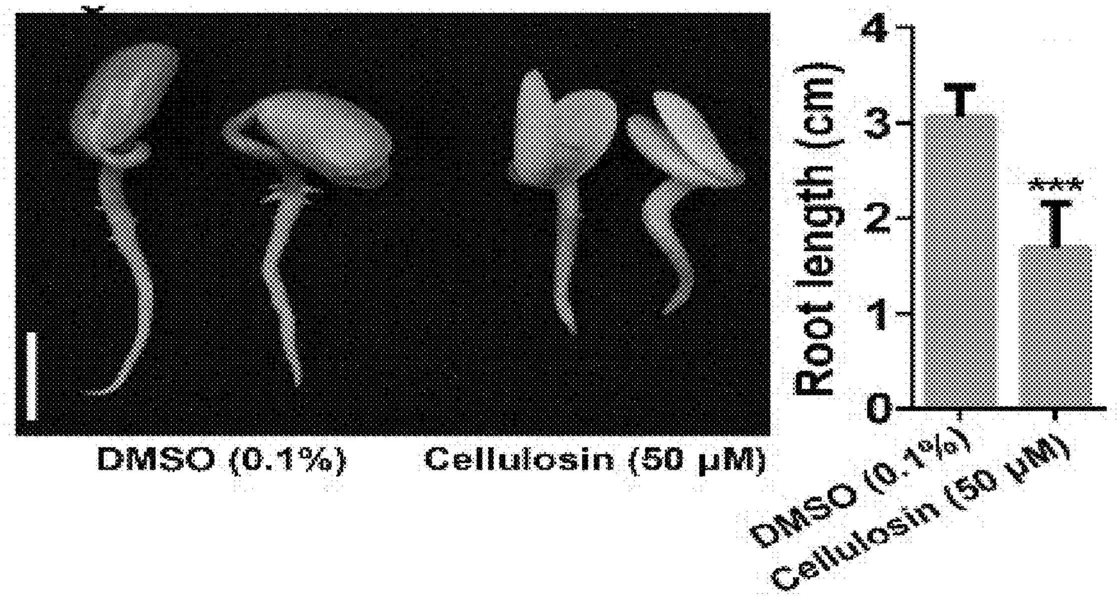
Figure 5F:
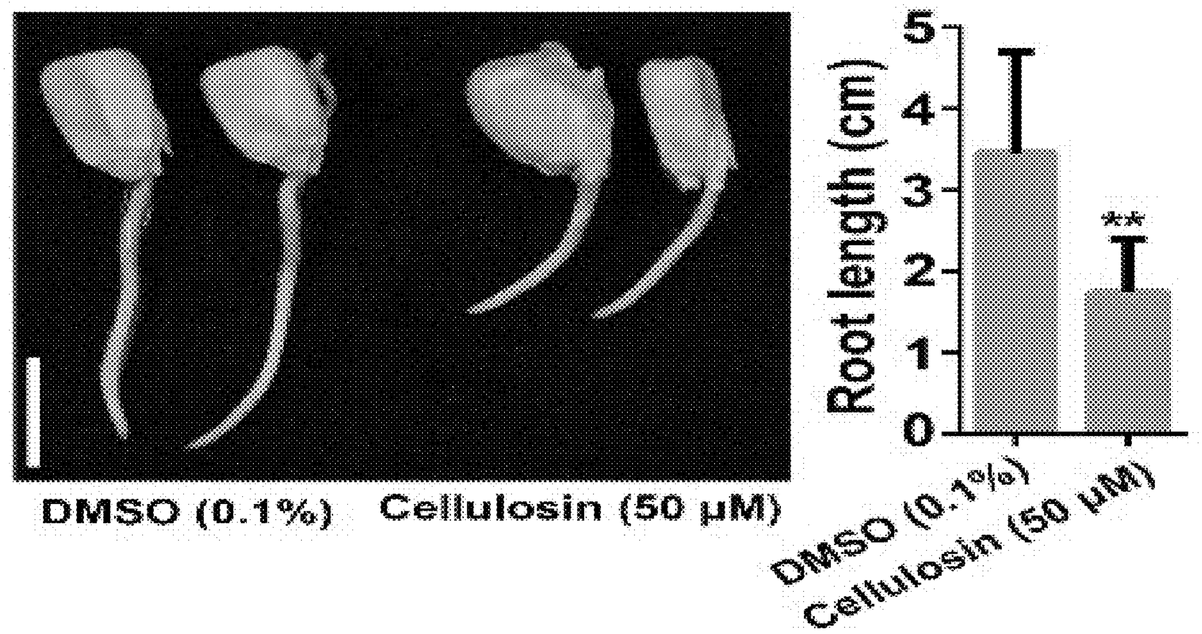

Cellulosin inhibits the growth of different plant species. In order to test the inhibitory effect of Cellulosin on different plant species, we grew different plants in various concentrations of Cellulosin. We found that Cellulosin inhibits tomato and tobacco growth most efficiently and inhibition was observed with concentrations less than 5 μM (FIG. 5A, 5B). Cellulosin significantly inhibited the lawn grasses Kentucky Bluegrass and Perennial Ryegrass at the concentration of 50 μM (FIG. 5C, 5D). Cellulosin also inhibits the growth of crops soybean and maize at 50 μM (FIG. 5E, 5F). These results indicate that Cellulosin can inhibit the growth of both dicotyledon and monocotyledon plants and thus can serve as a potential herbicide.

Cellulosin Inhibits Plant Growth when Sprayed on Seedlings.

Figure 6A:
FIGS. 6A-6B demonstrate that Cellulosin inhibits plant growth in soil.
Figure 6B:
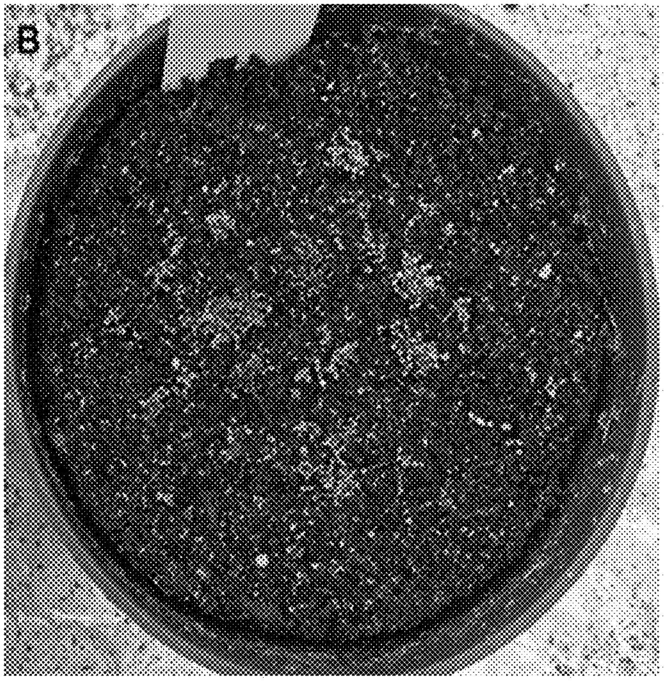

In order to further test the possibility of using Cellulosin as an herbicide in the field, we sprayed Cellulosin solution on Arabidopsis seedlings grown in the soil. We found that Cellulosin inhibits Arabidopsis growth after being sprayed on the plants (FIGS. 6A-6B). This indicates that Cellulosin can be used to control plant growth by directly spraying in the soil.

FIGS. 1A-1F show that known isoxaben resistant mutants ixr1-1, ixr1-2 and ixr2-1 are not resistant to Cellulosin.

Figures 2A, 2B, 2C, 2D:
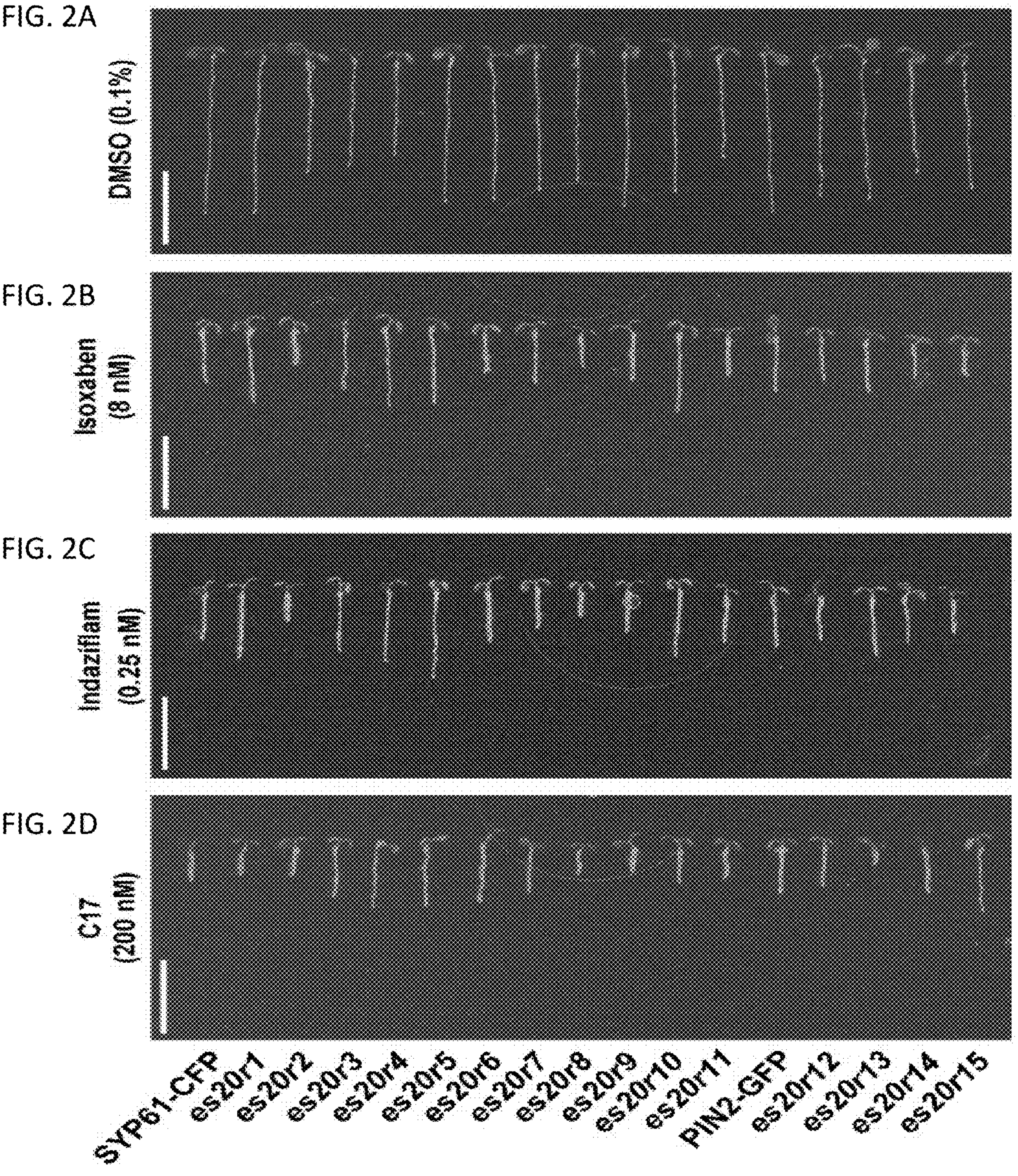
FIGS. 2A-2D show that, as compared with DMSO control (FIG. 2A), most of Cellulosin resistant mutants are sensitive to compounds isoxaben (FIG. 2B), indaziflam (FIG. 2C) and C17 (FIG. 2D).

Wildtype (WT) Arabidopsis and its mutants ixr1-1, ixr1-2, and ixr2-1 are grown on media supplemented with DMSO (FIGS. 1A-1B), isoxaben (FIGS. 1C-1D) or Cellulosin (FIGS. 1E-1F) and their quantifications on their root length. Arabidopsis mutants ixr1-1, ixr1-2 and ixr2-1 have longer roots in compare with wildtype (Col) on media supplemented with isoxaben. However, these mutants do not show difference in growth in compare with wildtype (Col) on media supplemented with Cellulosin. Bars: 1 cm FIGS. 2A-2D show that, as compared with DMSO control (FIG. 2A), most of Cellulosin resistant mutants are sensitive to compounds isoxaben (FIG. 2B), indaziflam (FIG. 2C) and C17 (FIG. 2D).

Figure 2E:
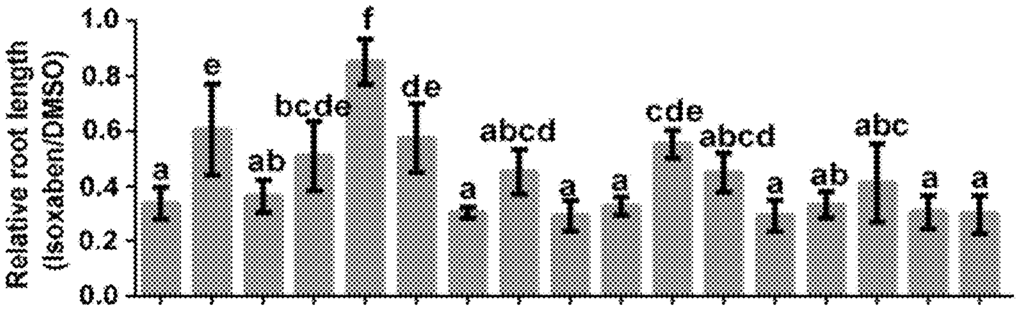
FIGS. 2E-2G depict quantifications of root length of Cellulosin resistant mutants on media supplemented with isoxaben (FIG. 2E), indaziflam (FIG. 2F), and C17 (FIG. 2G) in comparison with DMSO control, Statistically significant differences in right panels were determined by one-way ANOVA test followed by Tukey's multiple comparisons test. Different letters of root length of seedlings indicate significant difference between groups ($p<0.05$). Bars: 1 cm.
Figure 2F:
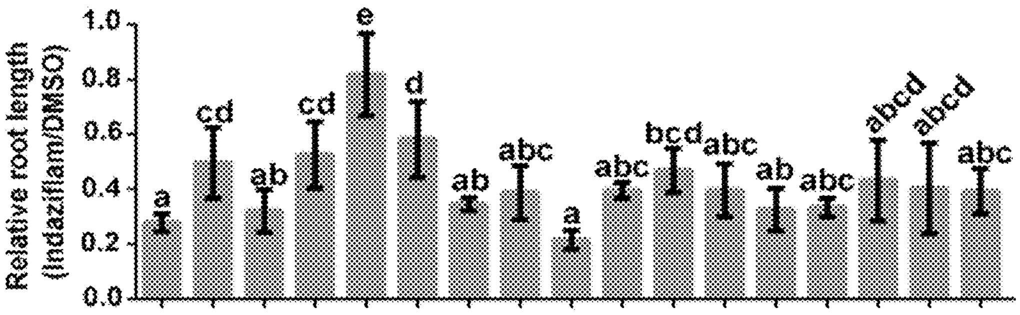
Figure 2G:
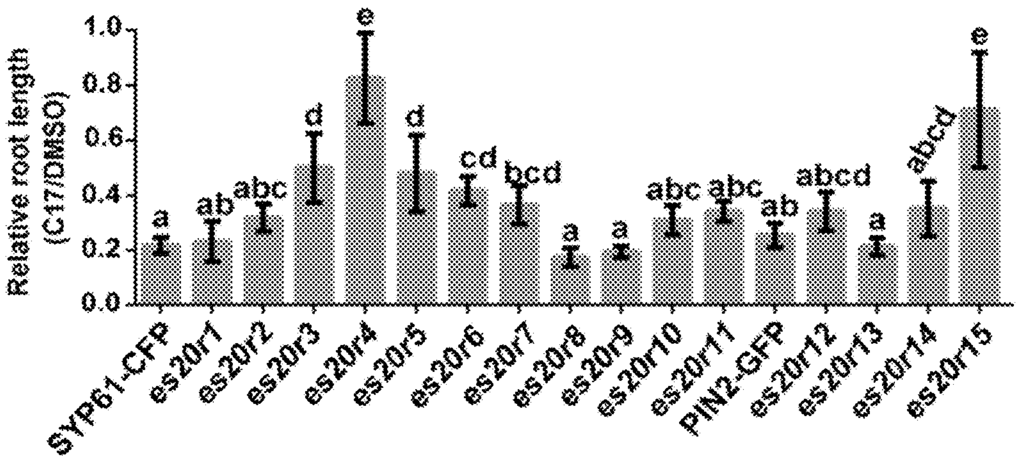

FIGS. 2E-2G depict quantifications of root length of Cellulosin resistant mutants on media supplemented with isoxaben (FIG. 2E), indaziflam (FIG. 2F), and C17 (FIG. 2G) in comparison with DMSO control, Statistically significant differences in right panels were determined by one-way ANOVA test followed by Tukey's multiple comparisons test. Different letters of root length of seedlings indicate significant difference between groups ($p<0.05$). Bars: 1 cm.

Figures 3A, 3B, 3C, 3D:
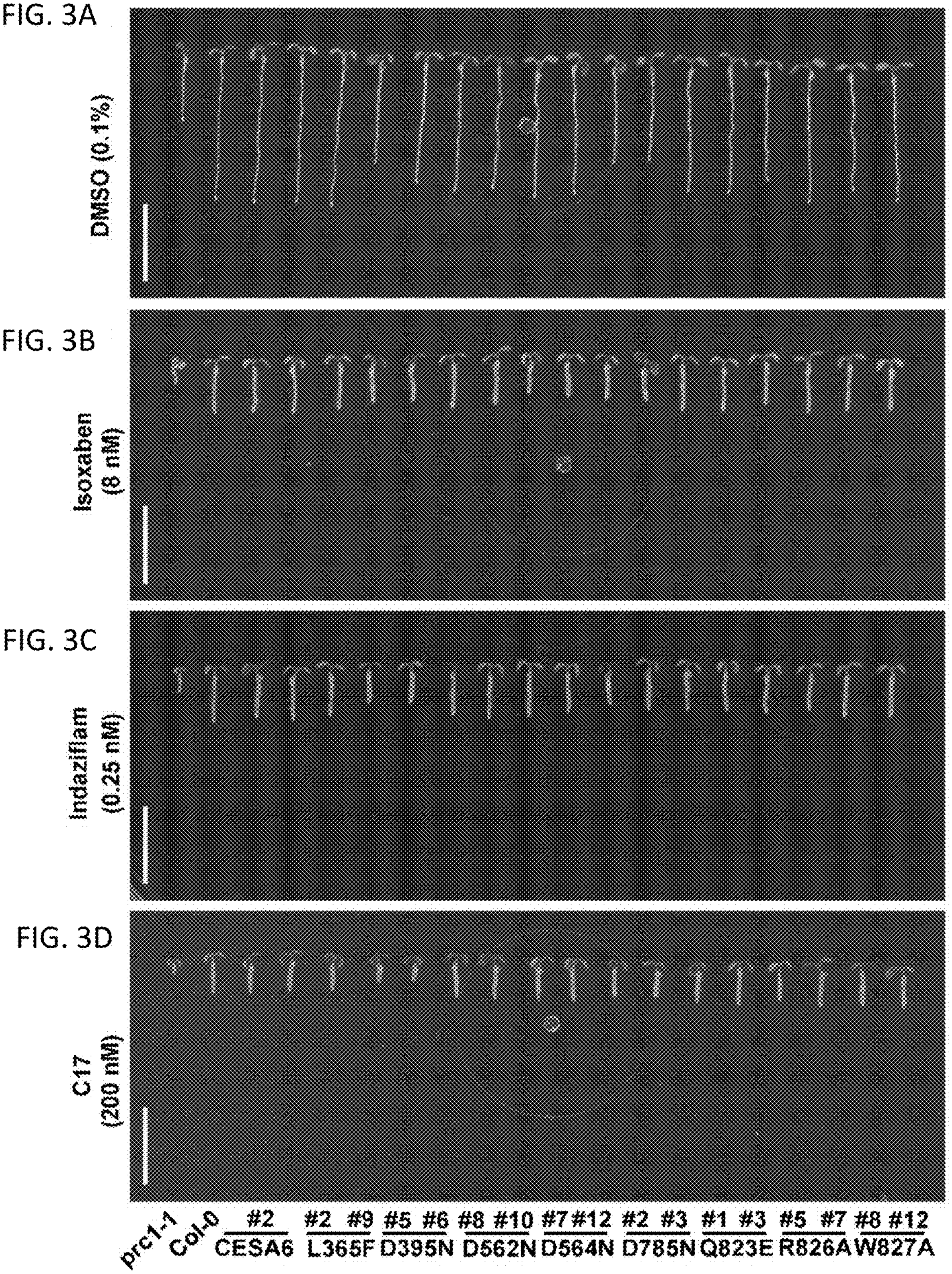
FIGS. 3A-3D demonstrate that plants expressing CesA6 carrying mis-sense mutations at the catalytic site of Cellulosin do not show resistance to isoxaben, indaziflam and C17 in growth compared with DMSO control: DMSO (FIG. 3A), isoxaben (FIG. 3B), Indaziflam (FIG. 3C) and C17 (FIG. 3D). Bars: 1 cm.

FIGS. 3A-3D demonstrate that plants expressing CesA6 carrying mis-sense mutations at the catalytic site of Cellulosin do not show resistance to isoxaben, indaziflam and C17 in growth compared with DMSO control: DMSO (FIG. 3A), isoxaben (FIG. 3B), Indaziflam (FIG. 3C) and C17 (FIG. 3D). Bars: 1 cm.

FIGS. 4A-4B demonstrate the synergistic effect of Cellulosin with isoxaben and indaziflam. FIG. 4A shows Arabidopsis wildtype plants grown on DMSO, Cellulsoin, isoxaben, indaziflam, C17, Cellulosin with isoxaben, Cellulosin with indaziflam, and Cellulosin with C17. Plant growth was not inhibited by 0.25 μM Cellulosin, 4 nM isoxaben, 0.25 nM indaziflam or 4 nM C17 significantly. However, combined application of 0.25 μM Cellulosin and 4 nM isoxaben, 0.25 μM Cellulosin and 0.25 nM indaziflam, or 0.25 μM Cellulosin and 4 nM C17 significantly inhibited plant growth. Bar, 1 cm.

FIG. 4B shows quantification on the root length of Arabidopsis plants grown on media with control (0.1% DMSO), 0.25 μM Cellulosin, 4 nM isoxaben, 0.25 nM indaziflam, 4 nM C17, 0.25 μM Cellulosin and 4 nM isoxaben, 0.25 μM Cellulosin with 0.25 nM indaziflam, or 0.25 μM Cellulosin and 4 nM C17. Statistically significant differences in right panels were determined by one-way ANOVA test followed by Tukey's multiple comparisons test. Different letters of root length of seedlings indicate significant difference between groups ($p<0.05$). N=12.

FIGS. 5A-5F demonstrate that Cellulosin inhibits the growth of different plant species. FIG. 5A shows Cellulosin inhibition of tomato growth. FIG. 5B shows Cellulosin inhibition of tobacco growth. FIG. 5C shows Cellulosin inhibition of Kentucky Bluegrass growth. FIG. 5D shows Cellulosin inhibition of Perennial Ryegrass growth. FIG. 5E shows Cellulosin inhibition of soybean growth. FIG. 5F shows Cellulosin inhibition of maize growth. Bars: 1 cm. Statistical analysis was performed using student t-test. $p<0.01$. *$p<0.001$.

FIGS. 6A-6B demonstrate that Cellulosin inhibits plant growth in soil. FIG. 6A shows Arabidopsis plants sprayed with control solution. FIG. 6B shows Arabidopsis plants sprayed with Cellulosin (500 μM).

Figure 7:
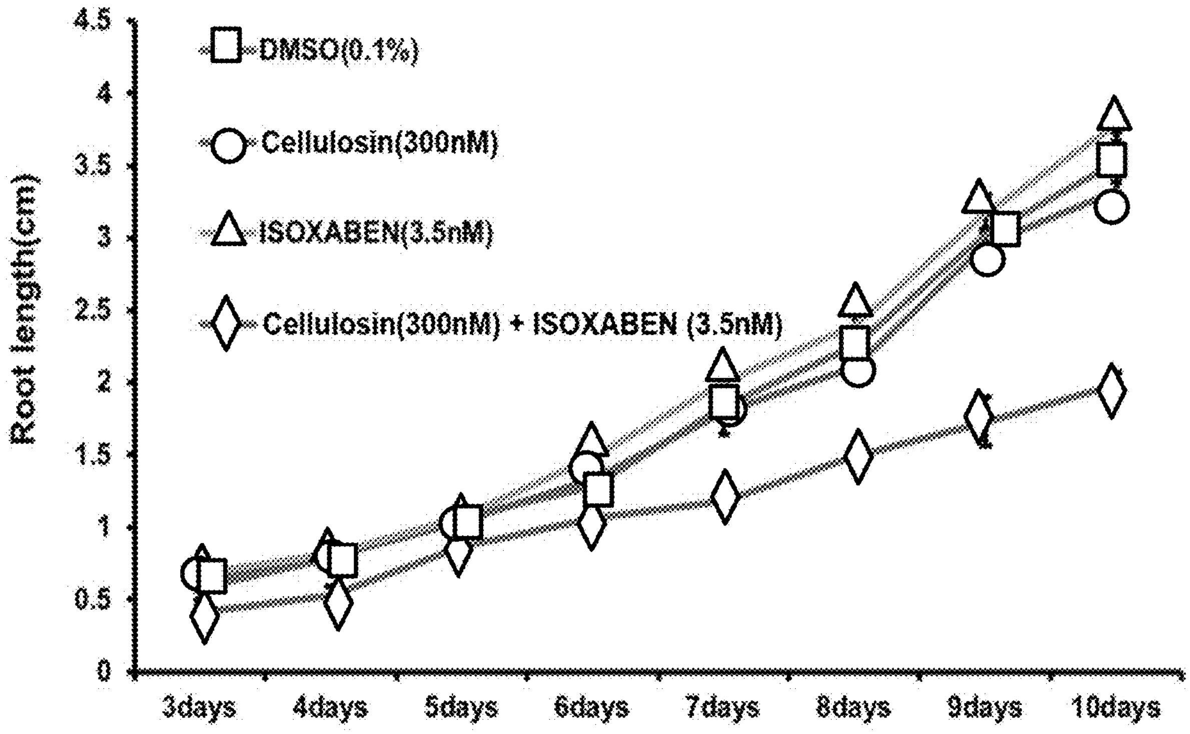
FIG. 7 demonstrates synergistic effect between Cellulosin and isoxaben. Neither 300 nM Cellulosin nor 3.5 nM isoxaben significantly inhibits plant growth. However, combined application of 300 nM and 3.5 nM isoxaben significantly inhibits plant growth. Nine days old Arabidopsis plants grown on control condition (0.1% DMSO), 300 nM Cellulosin, 3.5 nM isoxaben, or 300 nM Cellulosin and 3.5 nM Isoxaben are shown. Bar, 1 cm.

FIG. 7 demonstrates synergistic effect between Cellulosin and isoxaben. Neither 300 nM Cellulosin nor 3.5 nM isoxaben significantly inhibits plant growth. However, combined application of 300 nM and 3.5 nM isoxaben significantly inhibits plant growth. Nine days old Arabidopsis plants grown on control condition (0.1% DMSO), 300 nM Cellulosin, 3.5 nM isoxaben, or 300 nM Cellulosin and 3.5 nM Isoxaben are shown. Bar, 1 cm.

Cellulosin and isoxaben have synergistic effect in inhibiting plant growth. Because Cellulosin and isoxaben target CesA at different sites, it allowed us to hypothesize that application of both herbicides at the same time will make it possible to control the weeds with reduced dosage of both herbicides. This should also avoid the development of herbicide-resistant weeds that is caused by repetitive application of the same herbicide. We tested the growth of Arabidopsis at lower dosage of both Cellulosin and isoxaben. It was found that Cellulosin does not significantly inhibit plant growth at 300 nM concentration; and at 3.5 nM concentration, isoxaben does not significantly inhibit plant growth either. However, when we apply 300 nM Cellulosin and 3.5 nM isoxaben in the growth media, plant growth is significantly inhibited (FIG. 7). This indicates that the combination of both Cellulosin and isoxaben herbicides can increase the efficiency of weed control.

In summary, Cellulosin has a different mode of action than isoxaben, indaziflam and C17. Cellulosin inhibits the growth of different plant species, which makes it a broad-spectrum herbicide. Cellulosin has synergistic effects with isoxaben, indaziflam and C17. Application of Cellulosin together with isoxaben, indaziflam or C17 increases the efficiency and long term effects of weeds control. Cellulosin inhibits plant growth condition in soil, which indicates that it can be used as a herbicide to control weeds growth by being sprayed.

Those skilled in the art will recognize that numerous modifications can be made to the specific implementations described above. The implementations should not be limited to the particular limitations described. Other implementations may be possible.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected. It should be understood by those skilled in the art that various alternatives to the embodiments described herein may be employed in practicing the claims without departing from the spirit and scope as defined in the following claims.

What is claimed is:

1. A method of weed control for a field of a plant comprising;

a) applying isoxaben together with one or more diluents, excipients or carriers to the field of the plant in need of said weed control, b) applying cellulosin together with one or more diluents, excipients or carriers to the same field in need of weed control, where steps a and b can be conducted in either order.

2. The method of claim 1, wherein the ratio of isoxaben and cellulosin ranges from about 1:100 to about 100:1 on a molar basis.

3. The method of claim 2, wherein the amount of isoxaben and cellulosin ranges from about 0.01 mg/mL to about 5,000 mg/mL.

4. The method of claim 1, wherein the plant is resistant to isoxaben.

5. The method of claim 1, wherein the plant is resistant to cellulosin.

6. The method of claim 1, wherein the plant is a crop for food or feed.

7. The method of claim 1, wherein isoxaben and cellulosin are applied to the field of the plant in need of said weed control together with one or more additional herbicides having the same or different mode of action.

8. A method of weed control for a field of a plant comprising a step of applying isoxaben and cellulosin, together with one or more diluents, excipients or carriers to the field of the plant in need of said weed control, wherein the ratio of isoxaben and cellulosin ranges from about 1:100 to about 100:1 on a molar basis and the amount of isoxaben and cellulosin ranges from about 0.01 mg/mL to about 5,000 mg/mL.

9. The method of claim 8 wherein the isoxaben and cellulosin are applied to the field of the plant together as a mixture of preformulated single products.

10. The method of claim 8, wherein the plant is resistant to isoxaben.

11. The method of claim 8, wherein the plant is resistant to cellulosin.

12. The method of claim 8, wherein the plant is a crop for food or feed.

13. The method of claim 8, wherein isoxaben and cellulosin are applied to the field of the plant in need of said weed control together with one or more additional herbicides having the same or different mode of action.

* * * * *